US011514592B2

(12) United States Patent
Shishido

(10) Patent No.: US 11,514,592 B2
(45) Date of Patent: Nov. 29, 2022

(54) CONTROL METHOD FOR PROJECTOR AND PROJECTOR

(71) Applicant: SEIKO EPSON CORPORATION, Tokyo (JP)

(72) Inventor: Yoichi Shishido, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 16/941,023

(22) Filed: Jul. 28, 2020

(65) Prior Publication Data

US 2021/0035316 A1   Feb. 4, 2021

(30) Foreign Application Priority Data

Jul. 29, 2019   (JP) .............................. JP2019-138611

(51) Int. Cl.
*G06T 3/40* (2006.01)
*G06T 7/11* (2017.01)
*G06T 7/33* (2017.01)
*H04N 9/31* (2006.01)

(52) U.S. Cl.
CPC ............ *G06T 7/337* (2017.01); *G06T 3/4038* (2013.01); *G06T 7/11* (2017.01); *H04N 9/3147* (2013.01); *H04N 9/3185* (2013.01)

(58) Field of Classification Search
CPC ......... G06T 3/4038; G06T 7/11; G06T 7/337; H04N 9/3147; H04N 9/3185
See application file for complete search history.

(56) References Cited

U.S. PATENT DOCUMENTS

| 10,244,197 B2 | 3/2019 | Tamura | |
|---|---|---|---|
| 2007/0291233 A1* | 12/2007 | Culbertson | .......... H04N 9/3194 353/34 |
| 2012/0069180 A1* | 3/2012 | Kawamura | .......... H04N 9/3194 353/7 |

(Continued)

FOREIGN PATENT DOCUMENTS

| CN | 103313009 A | * | 9/2013 | ............. G03B 21/14 |
|---|---|---|---|---|
| CN | 103313010 A | * | 9/2013 | ............ H04N 9/3185 |

(Continued)

OTHER PUBLICATIONS

Park et al. ("Auto-calibration of multi-projector displays with a single handheld camera," IEEE Scientific Visualization Conference; date of Conference: Oct. 25-30, 2015) (Year: 1).*

*Primary Examiner* — Yubin Hung
(74) *Attorney, Agent, or Firm* — Dority & Manning, P.A.

(57) ABSTRACT

A first image including a first line segment is projected onto a projection surface to acquire first imaging data of a first projected image. A second image including a first mark and a second mark overlapping the first line segment is projected onto the projection surface to acquire second imaging data of a second projected image. Based on a positional relation between a third mark and a fourth mark located on a second line segment corresponding to the first line segment and a positional relation between the first mark and the second mark located on the first line segment, relation data that associates the first mark and the third mark and associates the second mark and the fourth mark is generated. Correction data is generated based on the relation data. Image data is corrected based on the correction data. A corrected image is projected onto the projection surface.

5 Claims, 14 Drawing Sheets

(56) References Cited

U.S. PATENT DOCUMENTS

| | | | | |
|---|---|---|---|---|
| 2012/0182416 A1* | 7/2012 | Kawaguchi | .......... | H04N 9/3185 353/69 |
| 2013/0293684 A1* | 11/2013 | Becker | ................ | G01B 11/245 348/47 |
| 2018/0101246 A1* | 4/2018 | Moussakhani | ........ | G06F 3/0425 |

FOREIGN PATENT DOCUMENTS

| CN | 103530880 B | * | 4/2016 |
|---|---|---|---|
| JP | 2011-257622 A | | 12/2011 |
| JP | 2013509767 A | * | 3/2013 |
| JP | 2015-080190 A | | 4/2015 |
| JP | 2018-148261 A | | 9/2018 |

* cited by examiner

CONTROL METHOD FOR PROJECTOR AND PROJECTOR

The present application is based on, and claims priority from JP Application Serial Number 2019-138611, filed Jul. 29, 2019, the disclosure of which is hereby incorporated by reference herein in its entirety.

BACKGROUND

1. Technical Field

The present disclosure relates to a control method for a projector and the projector.

2. Related Art

There has been disclosed a technique for, even when a projection surface is, for example, a curved surface and is not a plane, in order to project an image without distortion, correcting an image projected by a projector to offset distortion in the image. For example, JP-A-2011-257622 (Patent Literature 1) discloses a projector that projects an image including a plurality of marks onto a projection surface, captures a projected image displayed on the projection surface, acquires imaging data, species positions of the plurality of marks from the imaging data, and generates correction data from differences between positions of the respective plurality of marks and positions where the marks should be displayed when it is assumed that the projection surface is a plane.

However, when, because of distortion of the projected image displayed on the display surface by projecting the image onto the projection surface, the marks in the projected image deviate from the positions where the marks should be displayed, the positions of the plurality of marks are sometimes not aligned. Accordingly, it is sometimes difficult to specify to which of the plurality of marks included in the projected image displayed on the projection surface by projecting the image onto the projection surface a certain mark among the plurality of marks included in the image corresponds.

SUMMARY

A control method for a projector according to a preferred aspect of the present disclosure includes: projecting a first image including a first line segment onto a projection surface to thereby display a first projected image on the projection surface; acquiring first imaging data obtained by capturing the first projected image; projecting a second image including a first mark and a second mark overlapping the first line segment onto the projection surface to thereby display a second projected image on the projection surface; acquiring second imaging data obtained by capturing the second projected image; generating, based on a positional relation between a third mark and a fourth mark located on a second line segment corresponding to the first line segment in the second imaging data and a positional relation between the first mark and the second mark located on the first line segment, using the first imaging data, relation data that associates the first mark and the third mark and associates the second mark and the fourth mark; generating, based on the relation data, correction data for correcting distortion of an image projected onto the projection surface; correcting, based on the correction data, image data input to the projector; and projecting, onto the projection surface, a corrected image based on corrected image data obtained by correcting the image data.

A projector according to a preferred aspect of the present disclosure includes: a projecting section configured to project an image onto a projection surface; an acquiring section configured to acquire imaging data obtained by capturing the image projected onto the projection surface; a first generating section configured to generate relation data that associates marks included in two images; a second generating section configured to generate, based on the relation data, correction data for correcting distortion of the image projected onto the projection surface; and a correcting section configured to correct image data input to the projector. The projecting section projects a first image including a first line segment onto the projection surface to thereby display a first projected image on the projection surface, the acquiring section acquires first imaging data obtained by capturing the first projected image, the projecting section projects a second image including a first mark and a second mark overlapping the first line segment onto the projection surface to thereby display a second projected image on the projection surface, the acquiring section acquires second imaging data obtained by capturing the second projected image, the first generating section generates, based on a positional relation between a third mark and a fourth mark located on a second line segment corresponding to the first line segment in the second imaging data and a positional relation between the first mark and the second mark located on the first line segment, using the first imaging data, the relation data that associates the first mark and the third mark and associates the second mark and the fourth mark, the second generating section generates the correction data based on the relation data, the correcting section corrects, based on the correction data, the image data input to the projector, and the projecting section projects, onto the projection surface, a corrected image based on corrected image data obtained by correcting the image data.

DESCRIPTION OF EXEMPLARY EMBODIMENTS

Figure 1:
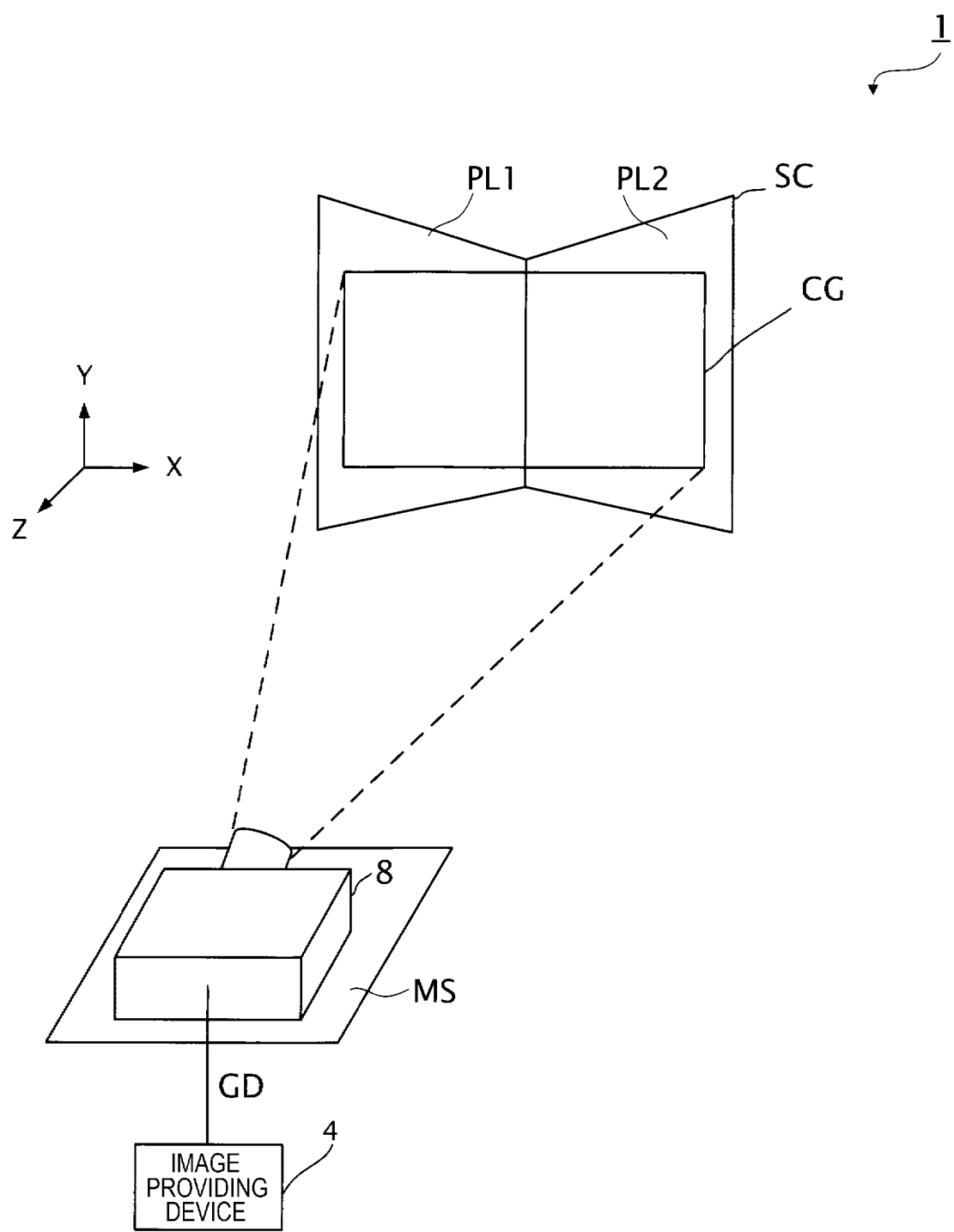
FIG. 1 is a diagram showing a projection system.

Modes for carrying out the present disclosure are explained below with reference to the drawings. In the drawings, dimensions and scales of sections are differentiated from actual ones as appropriate. Since embodiments explained below are preferred specific examples of the present disclosure, technically preferable various limitations are applied to the embodiments. However, the scope of the present disclosure is not limited to these embodiments unless specifically described in the following explanation that the present disclosure is limited.

A. First Embodiment

A projector 8 according to a first embodiment is explained.

A. 1. Overview of a Projection System 1

A projection system 1 is shown in FIG. 1. The projection system 1 includes an image providing device 4 and the projector 8. The image providing device 4 is, for example, a cellular phone, a PC, a DVD player, a game device, or a portable information storage medium such as a USB memory or a PC card. In this embodiment, the projector 8 capable of correcting distortion of a projected image is explained.

The image providing device 4 inputs image data GD to the projector 8. The projector 8 corrects the input image data GD, generates corrected image data CGD obtained by correcting the image data GD, and projects a corrected image CG based on the corrected image data CGD onto a projection surface SC.

The correction applied to the image data GD is processing for correcting distortion of an image projected onto the projection surface SC. As a situation in which distortion of an image occurs, there are, for example, two situations explained below. A first situation is a situation in which the projection surface SC is not one plane, for example, the projection surface SC includes a plurality of planes crossing one another, the projection surface SC is a curved surface, or unevenness is present on the projection surface SC. A second situation is a situation in which the projector 8 obliquely projects an image onto the projection surface SC. The shape of the projection surface SC shown in FIG. 1 is a shape formed by a first plane PL1 and a second plane PL2 crossing the first plane PL1.

In the following explanation, the shape formed by the first plane PL1 and the second plane PL2 is referred to as "corner surface shape". A shape of a side surface of a cylinder and a shape of a side surface of an elliptical cylinder are collectively referred to as "cylinder side surface shape".

The projector 8 corrects an image projected onto the projection surface SC to offset distortion of the image and generates the corrected image data CGD.

In the following explanation, an X axis, a Y axis, and a Z axis shown in FIG. 1 are defined as follows. The X axis, the Y axis, and the Z axis are orthogonal to one another. It is assumed that a placement surface MS for the projector 8 is parallel to an XZ plane. The Y axis is perpendicular to the placement surface MS. Further, the Z axis is parallel to an optical axis of the projector 8.

A. 2. Configuration of the First Embodiment

Figure 2:
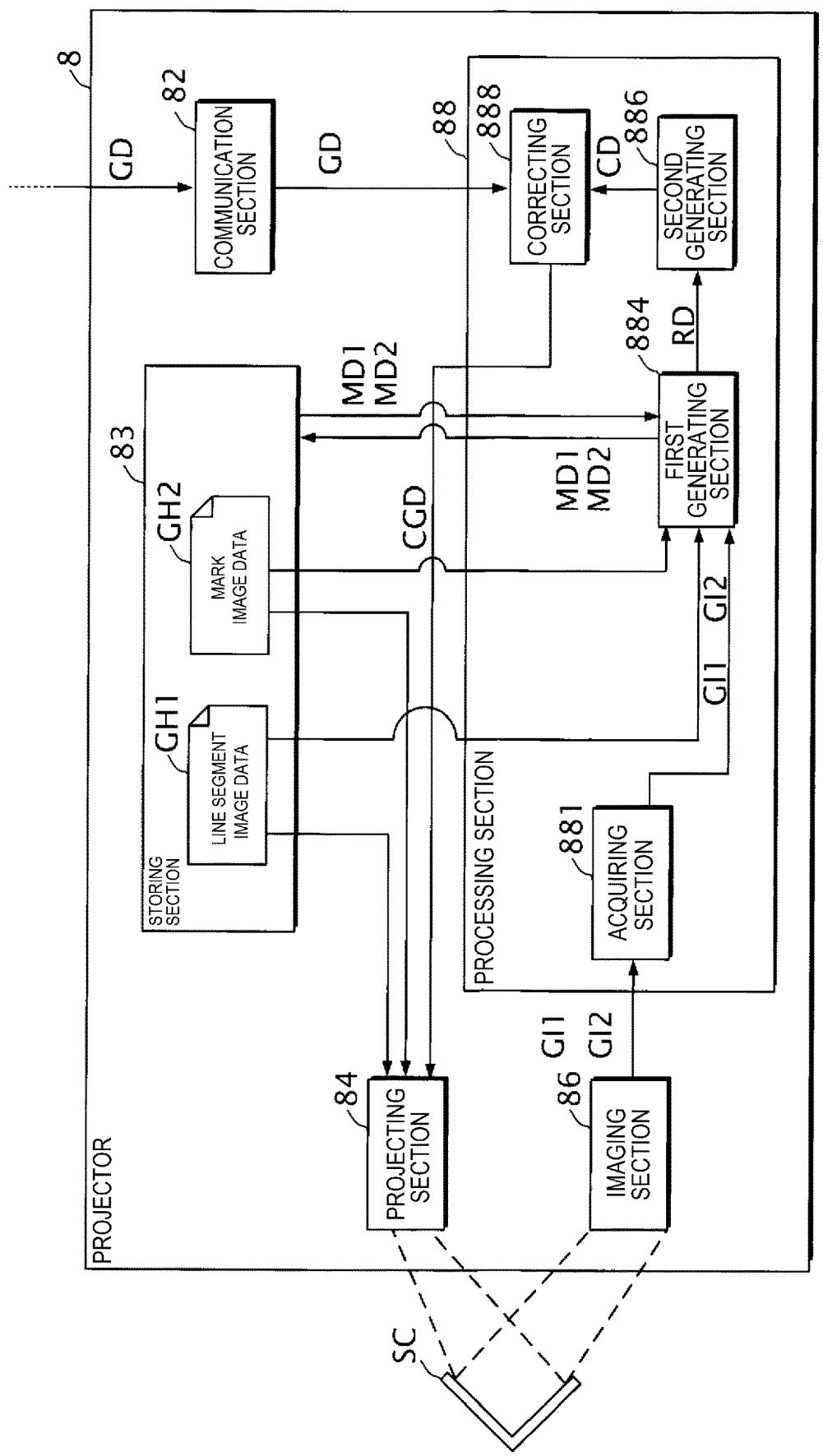
FIG. 2 is a diagram showing a configuration example of a projector.

A configuration example of the projector 8 is shown in FIG. 2. The projector 8 includes a communication section 82, a storing section 83, a projecting section 84, an imaging section 86, and a processing section 88. The communication section 82 is a device that communicates with other devices such as the image providing device 4 via a network such as the Internet. The communication section 82 includes a circuit for communicating with the other devices through wireless communication or wired communication. The communication section 82 receives the image data GD from the image providing device 4.

The storing section 83 is a recording medium readable by the processing section 88. The storing section 83 is configured by one or more kinds of storage circuits such as a ROM (Read Only Memory), an EPROM (Erasable Programmable ROM), an EEPROM (Electrically Erasable Programmable ROM), and a RAM (Random Access Memory). The storing section 83 stores a plurality of programs including a control program to be executed by the processing section 88, line segment image data GH1, and mark image data GH2.

A line segment image G1 indicated by the line segment image data GH1 is an example of a "first image". A mark image G2 indicated by the mark image data GH2 is an example of a "second image".

Figure 3:
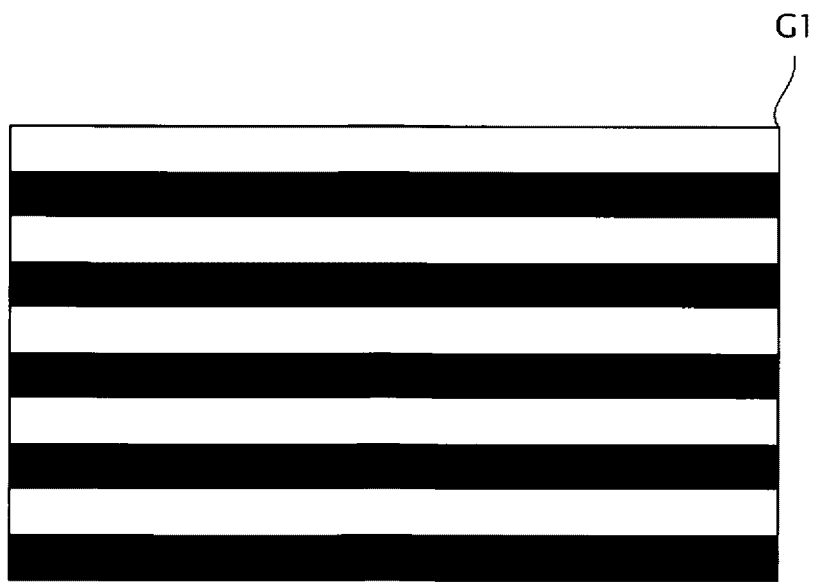
FIG. 3 is a diagram showing a line segment image.

The line segment image G1 is shown in FIG. 3. The line segment image G1 is a stripe pattern formed by rectangles parallel in the lateral direction, a so-called stripe. In the line segment image G1 shown in FIG. 3, white and black are used. The line segment image G1 is not limited to a combination of white and black. Any combination of colors is possible.

Figure 4:
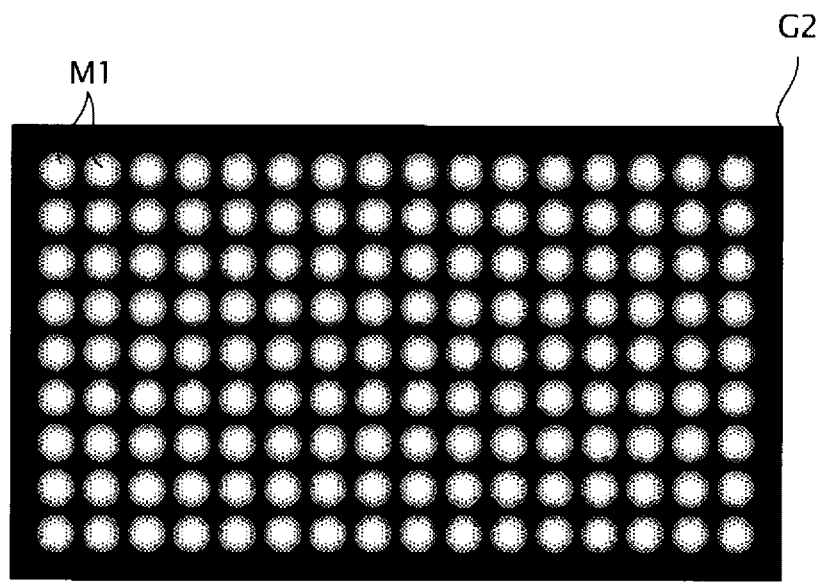
FIG. 4 is a diagram showing a mark image.

The mark image G2 is shown in FIG. 4. The mark image G2 includes a plurality of marks M1. In FIG. 4, in order to suppress complication of the drawing, only a part of the plurality of marks M1 is representatively denoted by signs. The marks M1 are signs or symbols. The marks M1 may take any form. In the mark image G2 shown in FIG. 4, the marks M1 are circles that are brightest white, that is, have highest-value luminance in the center and are black in the periphery. In the mark image G2 shown in FIG. 4, a plurality white circles are arranged in a lattice shape as the marks M1 on a black background.

Further, the line segment image G1 and the mark image G2 have a relation explained below.

Figure 5:
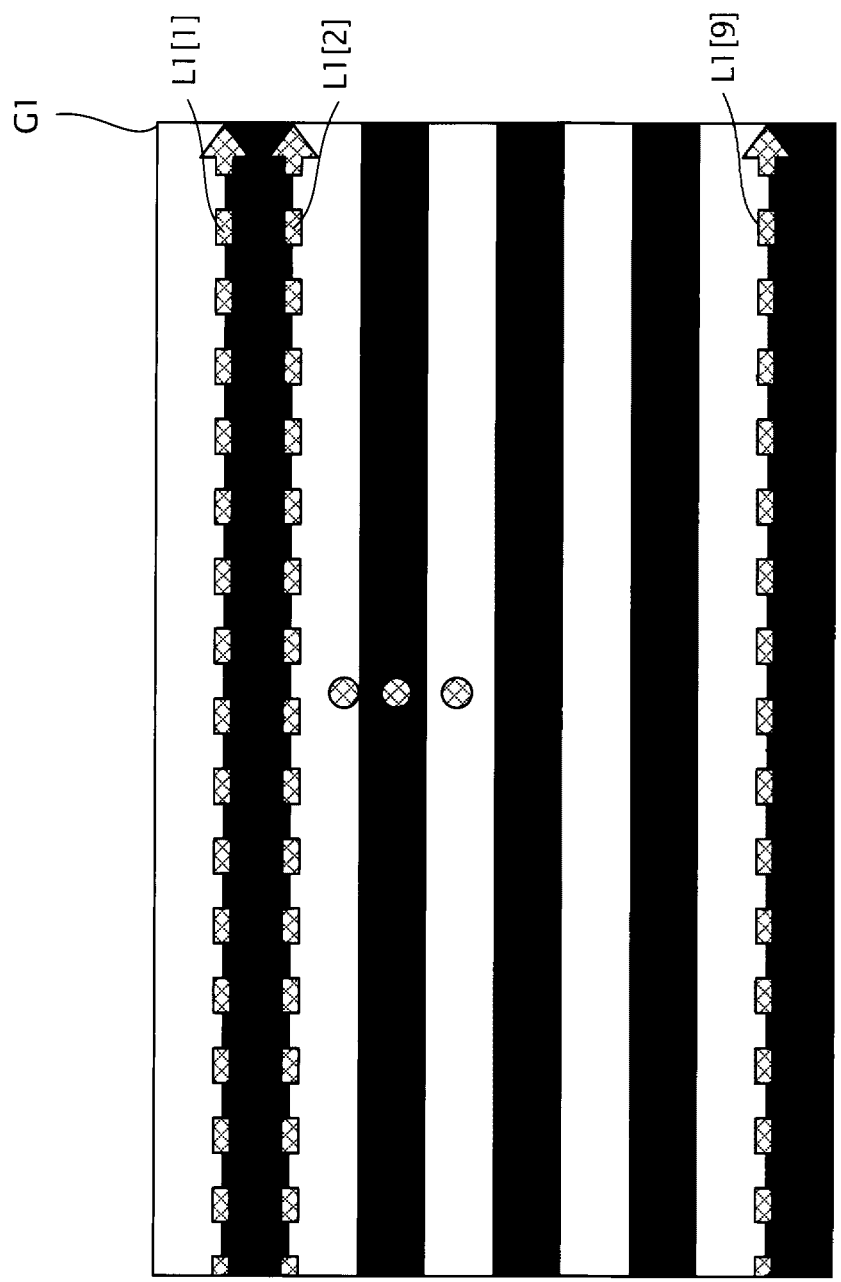
FIG. 5 is a diagram showing a line segment included in the line segment image.

Line segments L1 included in the line segment image G1 are shown in FIG. 5. The line segment image G1 includes a line segment L1[1] to a line segment L1[YMAX] as a plurality of line segments L1. A maximum value YMAX indicates the number of the line segments L1 included in the line segment image G1 and is an integer equal to or larger than 1. The line segments L1 are boundary lines among rectangles forming a stripe pattern. The line segment image G1 shown in FIG. 5 is an example in which the maximum value YMAX is 9. Hatching arrows and hatchings " " shown in FIG. 5 are displayed to explain the line segment L1[1] to a line segment L1[9] and are not displayed in an actual line segment image G1. If the line segment image G1 is projected onto the projection surface SC without distortion, the line segment L1[1] to the line segment L1[9] are arranged in the order of the line segment L1[1] to the line segment L1[9] in order from a +Y direction. A line segment L1[i] is parallel to the X axis.

The line segment L1[i] is an example of a "first line segment" and i is an integer from 1 to the maximum value YMAX.

Figure 6:
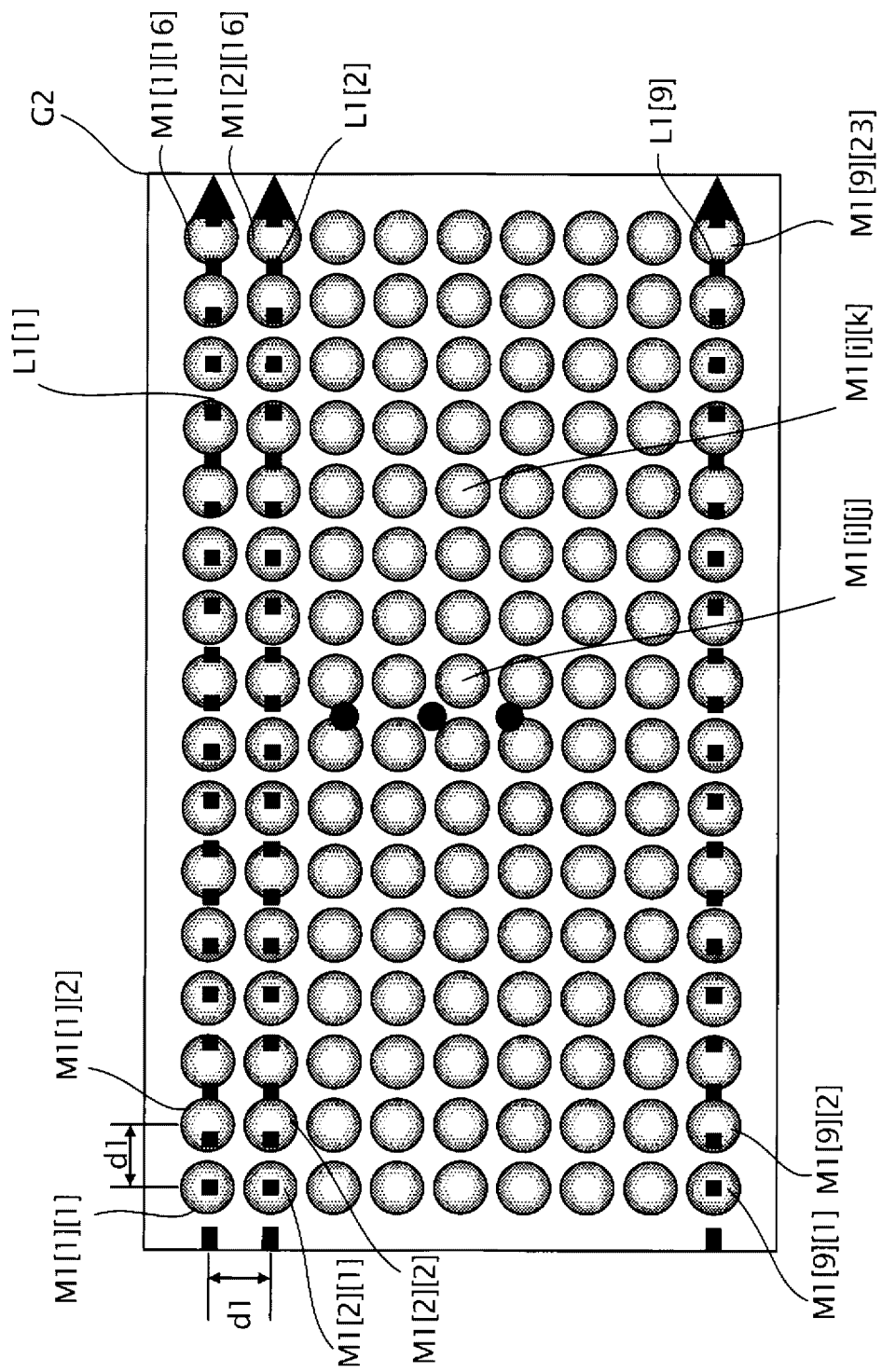
FIG. 6 is a diagram showing a mark included in the mark image.
Figure 9:
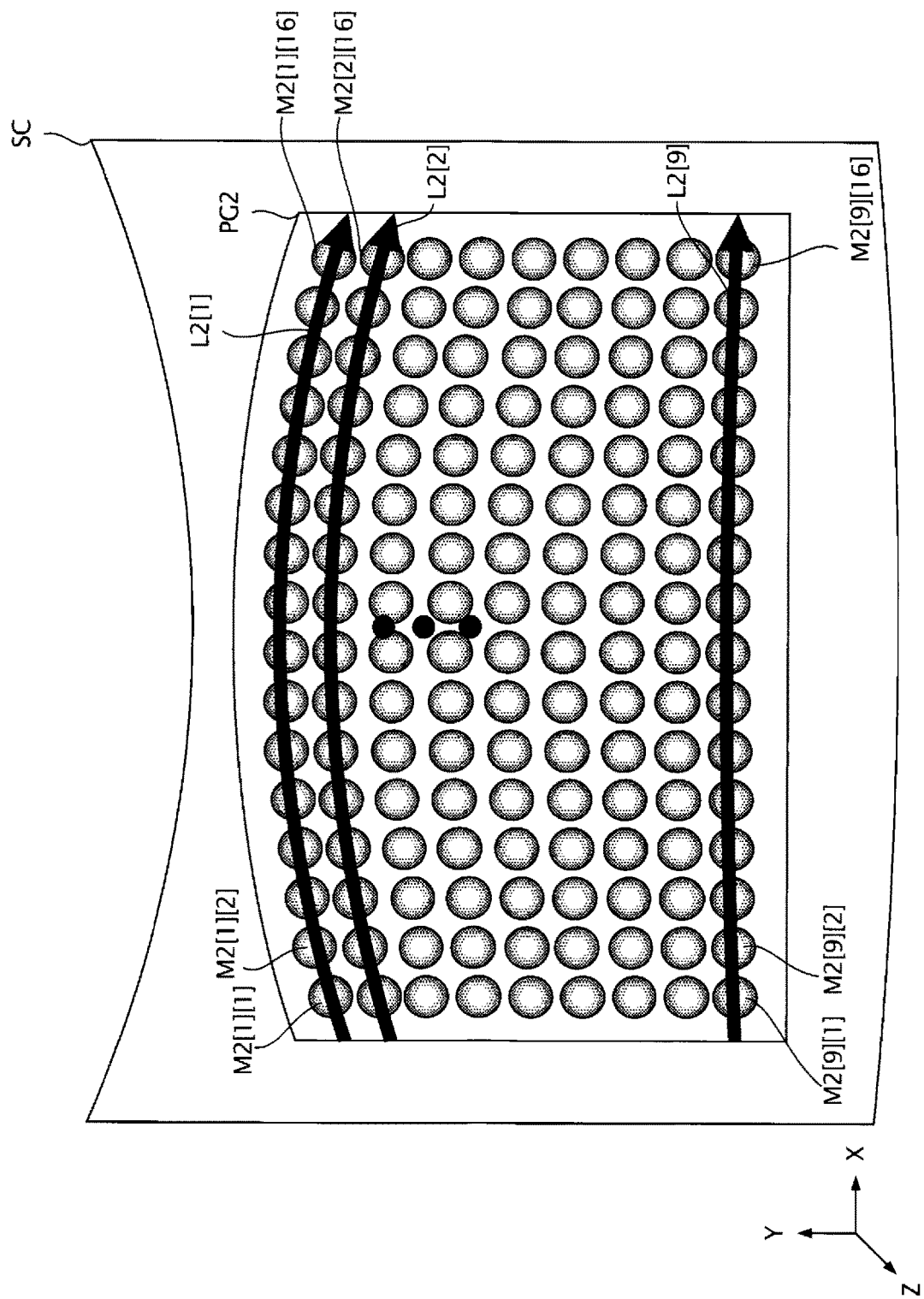
FIG. 9 is a diagram showing a mark projected image formed when the three-dimensional shape on the projection surface is the cylinder side surface shape.
Figure 11:
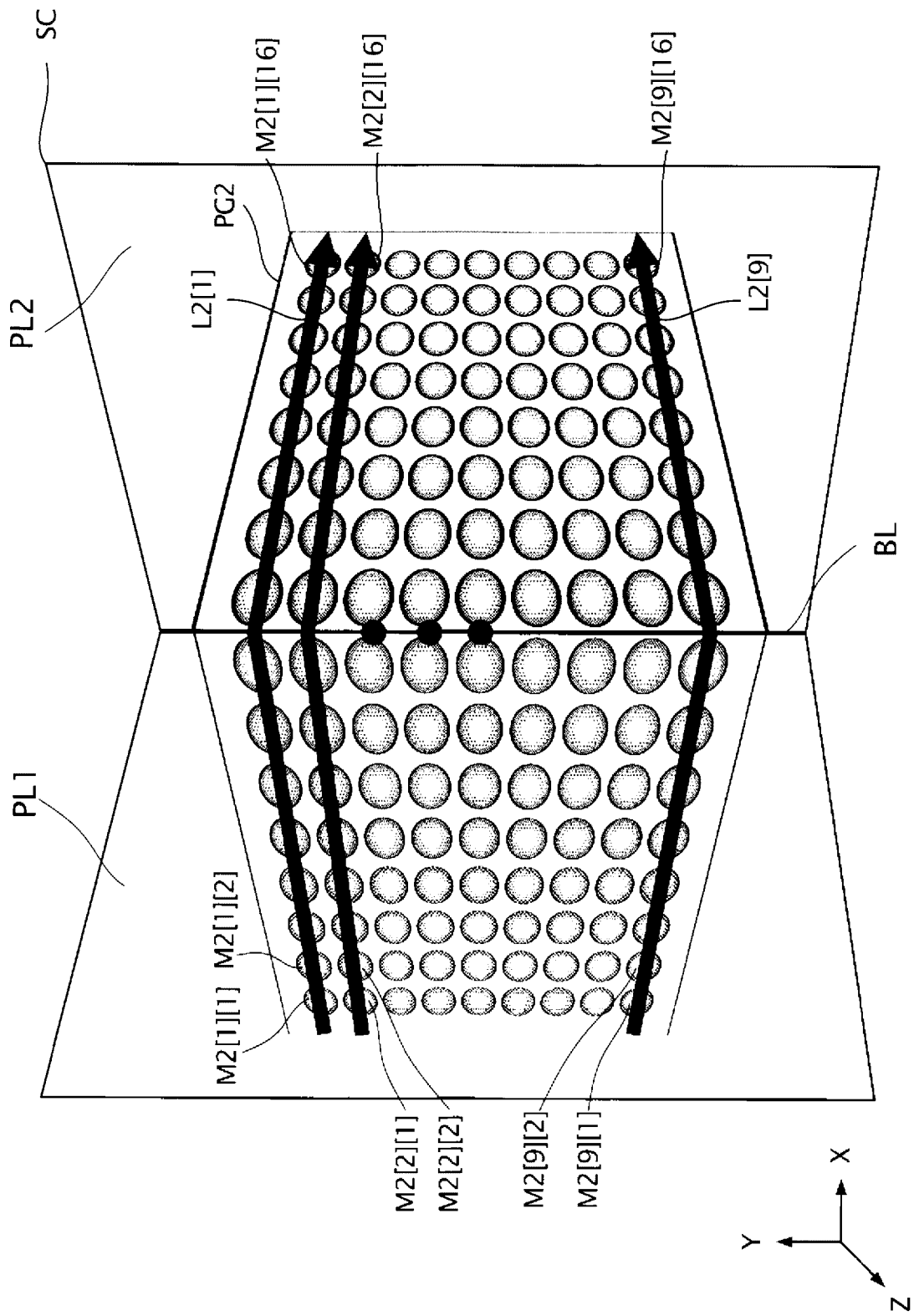
FIG. 11 is a diagram showing the mark projected image formed when the three-dimensional shape on the projection surface is the corner surface shape.

The marks M1 included in the mark image G2 are shown in FIG. 6. The mark image G2 includes a mark M1[1][1] to a mark M1[1][XMAX], a mark M1[2][1] to a mark M1[2][XMAX], and a mark M1[YMAX][1] to a mark M1[YMAX][XMAX] as the plurality of marks M1. When the line segment image G1 and the mark image G2 are superimposed in the same position, a mark M1[i][1] to a mark M1[i][XMAX] are located on the line segment L1[i]. If the mark image G2 is provided onto the projection surface SC without distortion, the mark M1[i][1] to the mark M1[i][XMAX] are arranged in the order of the mark M1[i][1] to the mark M1[i][XMAX] in order from a −X direction. A maximum value XMAX indicates the number of the marks M1 located on the line segment L1[i] and is an integer equal to or larger than 2. In FIGS. 6, 9, and 11, an example in which the maximum value YMAX is 9 and the maximum value XMAX is 16 is shown.

The mark image G2 shown in FIG. 6 is displayed with the black background replaced with white in order to suppress complication of the drawing. Black arrows and black H hatched rectangle shown in FIG. 6 are displayed to explain the line segment L1[1] to the line segment L1[9] and are not displayed in an actual mark image G2.

All of the distance between a mark M1[i][j] and a mark M1[i+1][j], the distance between a mark M1[i][k] and a mark M1[i+1][k], and the distance between the line segment L1[i] and a line segment L1[i+1] are the same distance d1: j and k are integers from 1 to the maximum value XMAX.

Referring back to FIG. 2, the projecting section 84 projects an image onto the projection surface SC. For example, the projecting section 84 projects the line segment image G1 onto the projection surface SC to thereby display a line segment projected image PG1 shown in FIGS. 8 and 10 on the projection surface SC. The projecting section 84 projects the mark image G2 onto the projection surface SC to thereby display a mark projected image PG2 shown in FIGS. 9 and 11 on the projection surface SC.

The line segment projected image PG1 is an image obtained by deforming the line segment image G1 according to a three-dimensional shape on the projection surface SC. Similarly, the mark projected image PG2 is an image obtained by deforming the mark image G2 according to the three-dimensional shape on the projection surface SC.

The line segment projected image PG1 is an example of a "first projected image". The mark projected image PG2 is an example of a "second projected image".

Figure 7:
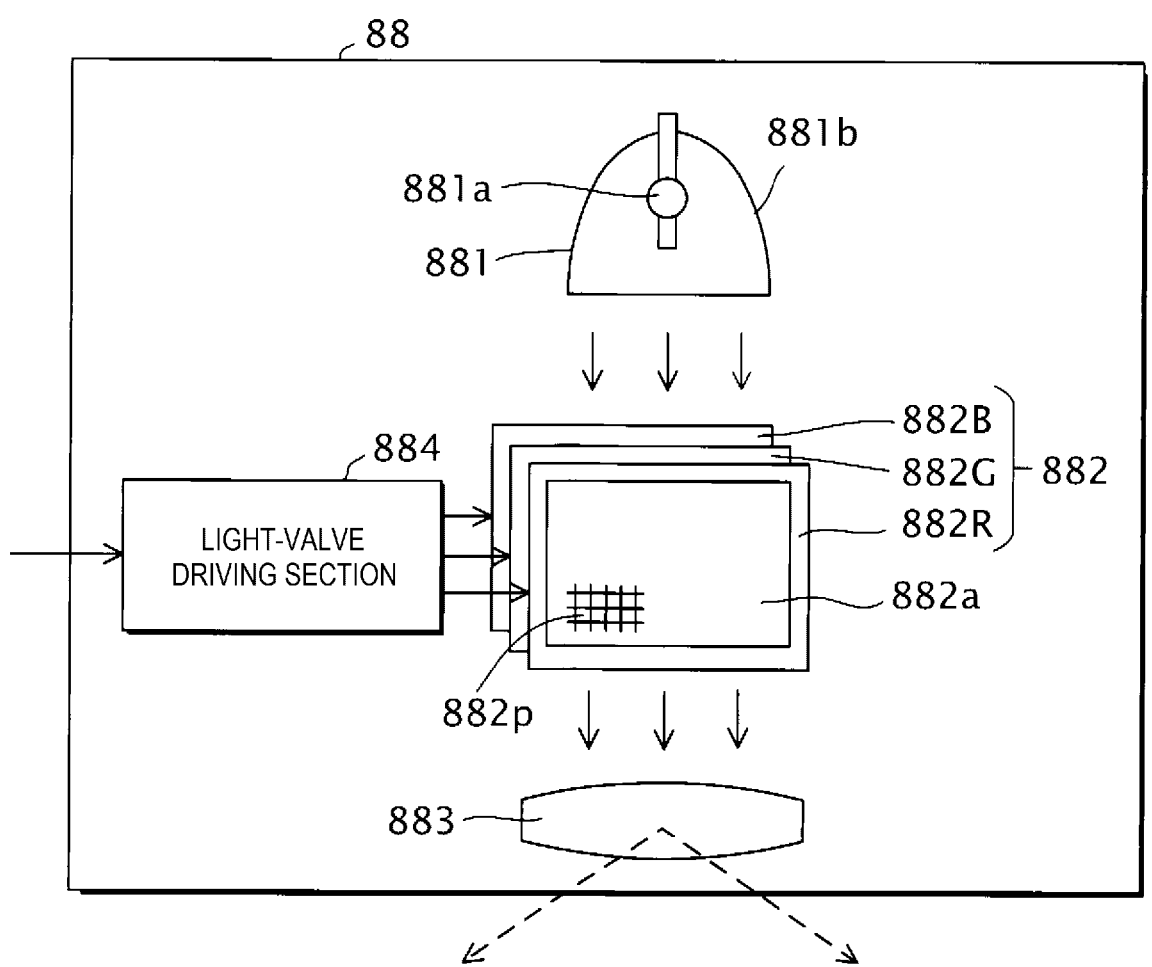
FIG. 7 is a diagram showing an example of a projecting section.

An example of the projecting section 84 is shown in FIG. 7. The projecting section 84 includes a light source 841, three liquid crystal light valves 842R, 842G, and 842B, which are examples of a light modulating device, a projection lens 843, which is an example of a projection optical system, and a light-valve driving section 844. The projecting section 84 modulates light emitted from the light source 841 with a liquid crystal light valve 842 to form an image and enlarges the image and projects the image from the projection lens 843. Consequently, the projection lens 843 displays the image on the projection surface SC.

The light source 841 includes a light source section 841a formed by a Xenon lamp, an ultrahigh pressure mercury lamp, an LED, a laser light source, or the like and a reflector 841b that reduces fluctuation in a direction of light radiated by the light source section 841a. LED is an abbreviation of Light Emitting Diode. Fluctuation in a luminance distribution of light emitted from the light source 841 is reduced by a not-shown integrator optical system. Thereafter, the light is separated into color light components of red, green, and blue, which are the three primary colors of light, by a not-shown color separation optical system. The color light components of red, green, and blue are respectively made incident on the liquid crystal light valves 842R, 842G, and 842B.

The liquid crystal light valve 842 is configured by, for example, a liquid crystal panel in which liquid crystal is encapsulated between a pair of transparent substrates. In the liquid crystal light valve 842, a rectangular pixel region 842a formed by a plurality of pixels 842p arrayed in a matrix shape is formed. In the liquid crystal light valve 842, a driving voltage can be applied to the liquid crystal for each of the pixels 842p. When the light-valve driving section 844 applies a driving voltage corresponding to the image data GD to the pixels 842p, the pixels 842p are set to light transmittance corresponding to the image data GD. Accordingly, the light emitted from the light source 841 is transmitted through the pixel region 842a to be modulated. An image to be projected onto the projection surface SC is formed for each of the color lights.

Referring back to FIG. 2, the imaging section 86 is a device that images the projection surface SC and outputs imaging data indicating a captured image. The output captured image is formed by, for example, a plurality of pixels arranged in a matrix shape. The imaging data includes data concerning luminance and the like for each of pixels of the captured image. The imaging section 86 includes, for example, an imaging optical system and an imaging element. The imaging optical system is an optical system including at least one imaging lens. The imaging optical system may include various optical elements such as a prism or may include a zoom lens and a focus lens. The imaging element is configured by, for example, a CCD image sensor or a CMOS image sensor. CCD is an abbreviation of Charge Coupled Device. CMOS is an abbreviation of Complementary MOS.

The imaging section 86 outputs line segment imaging data GI1 obtained by capturing the line segment projected image PG1. The imaging section 86 outputs mark imaging data GI2 obtained by capturing the mark projected image PG2.

The line segment imaging data GI1 is an example of "first imaging data". The mark imaging data GI2 is an example of "second imaging data".

The processing section 88 is a computer such as a CPU. CPU is an abbreviation of Central Processing Unit. The processing section 88 may be configured by one or a plurality of processors. The processing section 88 reads and executes programs stored in the storing section 83 to thereby function as an acquiring section 881, a first generating section 884, a second generating section 886, and a correcting section 888.

The acquiring section 881 acquires the line segment imaging data GI1. The acquiring section 881 acquires the mark imaging data GI2.

The first generating section 884 generates relation data RD that associates marks included in two images. More specifically, the first generating section 884 generates, based on a positional relation among XMAX projected marks M2 located on a projected line segment L2[i] corresponding to the line segment L1[i] in the mark imaging data GI2 and a positional relation among XMAX marks M1 located on the line segment L1[i], the relation data RD that associates any one of the XMAX projected marks M2 located on the projected line segment L2[i] with each of the XMAX marks M1 located on the line segment L1[i] using the line segment imaging data GI1.

A projected line segment L2 is an example of a "second line segment".

For example, when the maximum value XMAX is 2, the first generating section 884 generates, based on a positional relation between two projected marks M2 located on the projected line segment L2[i] and a positional relation between two marks M1 located on the line segment L1[i], the relation data RD that associates one of the two marks M1 and one of the two projected marks M2 and associates the other mark M1 different from the one mark M1 and the other projected mark M2 of the two projected marks M2.

One of the two marks M1 is an example of a "first mark" and the other mark M1 is an example of a "second mark". One of the two projected marks M2 is an example of a "third mark" and the other projected mark M2 is an example of a "fourth mark".

An example of the projected line segments L2 is explained with reference to FIGS. 8 and 10. An example of the projected marks M2 is explained with reference to FIGS. 9 and 11.

Figure 8:
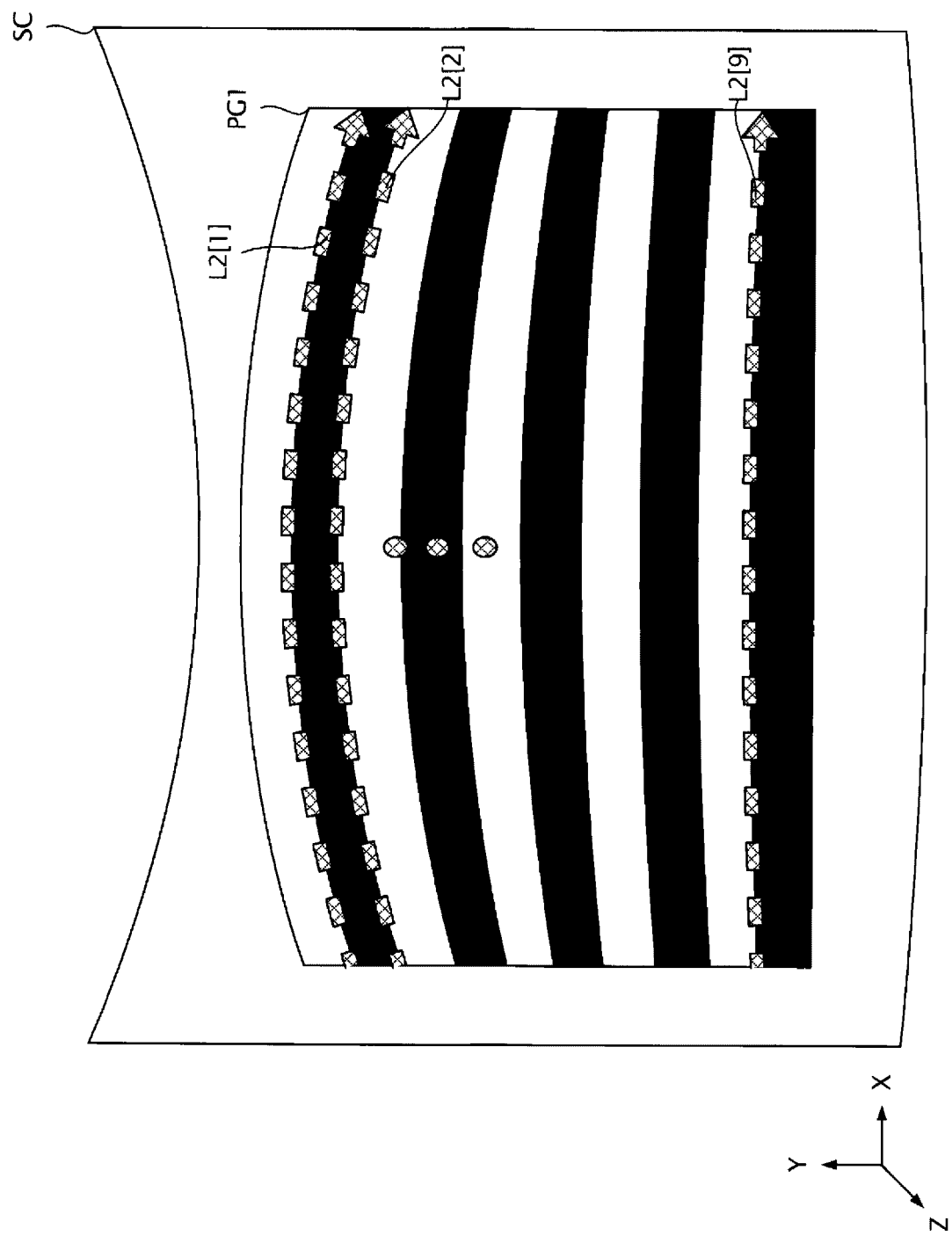
FIG. 8 is a diagram showing a line segment projected image formed when a three-dimensional shape on a projection surface is a cylinder side surface shape.

The line segment projected image PG1 formed when the three-dimensional shape on the projection surface SC is the cylinder side surface shape is shown in FIG. 8. When the three-dimensional shape on the projection surface SC is the cylinder side surface shape, the line segment projected image PG1 has a shape formed by drawing arcs of the upper side and the lower side of a square to separate from the center of the square. The line segment projected image PG1 includes a projected line segment L2[1] to a projected line segment L2[9]. The projected line segment L2[1] to the projected line segment L2[9] are also deformed to draw arcs according to the deformation of the line segment projected image PG1. Hatching arrows and hatching " " shown in FIG. 8 are displayed to explain the projected line segment L2[1] to the projected line segment L2[9] and are not displayed on an actual line segment projected image PG1.

The projected line segment L2[1] to the projected line segment L2[9] are also deformed according to the deformation of the line segment projected image PG1. However, a positional relation among the projected line segment L2[1] to the projected line segment L2[9] is the same as a positional relation among the line segment L1[1] to the line segment L1[9]. For example, the projected line segment L2[2] is located in the −X direction based on the projected line segment L2[1].

The mark projected image PG2 formed when the three-dimensional shape on the projection surface SC is the cylinder side surface shape is shown in FIG. 9.

When the three-dimensional shape on the projection surface SC is the cylinder side surface shape, like the line segment projected image PG1, the mark projected image PG2 has a shape formed by drawing arcs of the upper side and the lower side of a square to separate from the center of the square. The positions of a projected mark M2[1][1] to a projected mark M2[9][16] respectively corresponding to the mark M1[1][1] to a mark M1[1][16] move according to the projected line segment L2[1] to the projected line segment L2[9]. Black arrows and black hatched rectangle shown in FIG. 9 are displayed to explain the projected line segment L2[1] to the projected line segment L2[9] and are not displayed on an actual mark projected image PG2.

Figure 10:
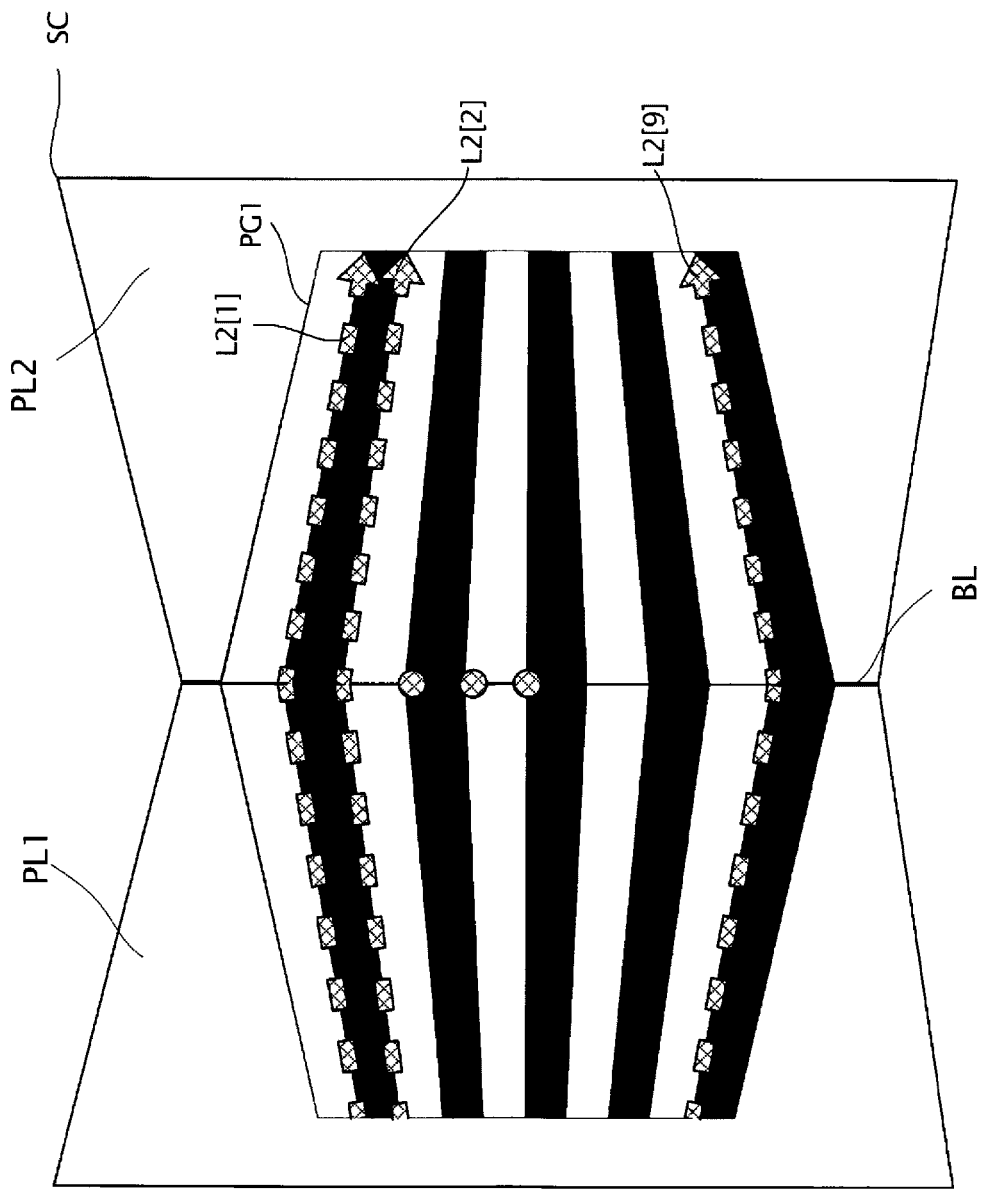
FIG. 10 is a diagram showing the line segment projected image formed when the three-dimensional shape on the projection surface is a corner surface shape.

The line segment projected image PG1 formed when the three-dimensional shape on the projection surface SC is the corner surface shape is shown in FIG. 10. When the three-dimensional shape on the projection surface SC is the corner surface shape, the line segment projected image PG1 has a shape formed by bending the square along a boundary line BL on which the first plane PL1 and the second plane PL2 cross. The projected line segment L2[1] to the projected line segment L2[9] are also deformed to be bent on the boundary line BL according to the deformation of the line segment projected image PG1. Hatching arrows and hatching [ ] shown in FIG. 10 are displayed to explain the projected line segment L2[1] to the projected line segment L2[9] and are not displayed on the actual line segment projected image PG1.

The mark projected image PG2 formed when the three-dimensional shape on the projection surface SC is the corner surface shape is shown in FIG. 11. When the three-dimensional shape on the projection surface SC is the corner surface shape, like the line segment projected image PG1, the mark projected image PG2 has a shape bent on the boundary line BL. The positions of the projected mark M2[1][1] to the projected mark M2[9][16] respectively corresponding to the mark M1[1][1] to the mark M1[9][16] move according to the projected line segment L2[1] to the projected line segment L2[9]. Black arrows and black " " shown in FIG. 11 are displayed to explain the projected line segment L2[1] to the projected line segment L2[9] and are not displayed on the actual mark projected image PG2.

Referring back to FIG. 2, concerning a positional relation among the mark M1[i][1] to the mark M1[i][XMAX], the projector 8 stores first mark data MD1 in the storing section 83. The first mark data MD1 is data that associates identification information of the marks M1, position information of the marks M1, identification information of the line segments L1 overlapping the marks M1, and values indicating in which positions counted from the −X direction the marks M1 are located on the line segments L1. As a generation method for the first mark data MD1, there are two methods explained below.

In a first generation method, a developer of the projector 8 operates a computer while viewing the mark image G2, whereby the computer generates the first mark data MD1.

In a second generation method, the first generating section 884 analyzes the mark image data GH2, specifies, for example, a region having luminance equal to or larger than a predetermined value as one mark M1 in the mark image G2, and detects a coordinate value of the center of gravity position of the region as a coordinate value indicating the center of gravity position of the mark M1. The coordinate value indicating the center of gravity position includes a coordinate value in the lateral direction and a coordinate value in the longitudinal direction. The first generating section 884 analyzes the line segment image data GH1, specifies boundary lines between black regions and white regions as the line segments L1 in the line segment image G1, and detects position information of the respective line segments L1[1] to L1[YMAX]. Position information of the line segments L1 is, for example, coordinate values of start points and coordinate values of end points of the line segments L1. The first generating section 884 specifies, based on the position information of the respective line segments L1[1] to L1[YMAX], on which line segments L1 among the line segment L1[1] to the line segment L1[YMAX] the marks M1 obtained from the mark image G2 are located. Concerning the determination whether the marks M1 are located on the line segments L1, for example, when a part of the line segments L1 is included within a predetermined range from the center of gravity positions of the marks M1, the first generating section 884 determines that the marks M1 are located on the line segments L1. The first generating section 884 stores the first mark data MD1 in the storing section 83. The identification information of the line segments L1 overlapping the marks M1 is equivalent to "i" of a mark M1[i][j]. The values indicating in which positions counted from the −X direction the marks M1 are located are equivalent to "j" of the mark M1[i][j] and are also equivalent to the positional relation among the mark M1[i][1] to the mark M1[i][XMAX]. In this way, in the first embodiment, the positional relation among the mark M1[i][1] to the mark M1[i][XMAX] is indicated by in which positions counted from the −X direction the marks M1 are located.

Concerning a positional relation among a projected mark M2[i][1] to a projected mark M2[i][XMAX] as well, the projector 8 stores second mark data MD2 in the storing section 83. The second mark data MD2 is data that associates identification information of the projected marks M2, position information of the projected marks M2, identification information of the projected line segments L2 overlapping the projected marks M2, and values indicating in which positions counted from the −X direction the projected marks M2 are located on the projected line segments L2. A generation method for the second mark data MD2 is the same as the second generation method for the first mark data MD1. Specifically, the first generating section 884 analyzes the mark imaging data GI2, specifies, for example, a region having luminance equal to or larger than a predetermined value as one protected mark M2 in the mark projected image PG2, and detects a coordinate value of the center of gravity position of the region as a coordinate value indicating the center of gravity position of the projected mark M2. The first generating section 884 analyzes the line segment imaging data GI1, specifies boundary lines between black regions and white regions as the projected line segments L2, and detects position information of the respective projected line segments L2[1] to L2[YMAX]. Position information of the projected line segments L2 is, for example, coordinate values of points forming the projected line segments L2. The first generating section 884 specifies, based on the position information of the respective projected line segments L2[1] to L2[YMAX], on which projected line segments L2 among the projected line segment L2[1] to the projected line segment L2[YMAX] the projected marks M2 are located. Concerning the determination whether the projected marks M2 are located on the projected line segments L2, for example, when a part of the projected line segments L2 is included within a predetermined range from the center of gravity positions of the projected marks M2, the first generating section 884 determines that the projected marks M2 are located on the projected line segments L2. The first generating section 884 stores the second mark data MD2 in the storing section 83. The identification information of the line segments L1 overlapping the projected marks M2 are equivalent to "i" of the mark M2[i][j]. The values indicating in which positions counted from the −X direction the projected marks M2 are located are equivalent to "j" of the projected mark M2[i][j] and are also equivalent to the positional relation among the projected mark M2[i][1] to the projected mark M2[i][XMAX].

The first generating section 884 generates, referring to the first mark data MD1 and the second mark data MD2, the relation data RD that associates a certain mark M1 and the projected mark M2 located on the projected line segment L2 corresponding to the line segment L1 overlapping the mark M1 and located in the same position as the mark M1 counted from the −X direction. Specifically, the first generating section 884 generates the relation data RD that associates the mark M1[i][1] and the projected mark M2[i][1], associates the mark M1[i][j] and the projected mark M2[i][j], and associates the mark M1[i][XMAX] and the projected mark M2[i][XMAX].

As the relation data RD, there are, for example, two forms explained below. The relation data RD in a first form indicates position information of the marks M1 and position information of the projected marks M2 associated with each other. The position information of the marks M1 is, for example, coordinate values indicating the center of gravity positions of the marks M1 in the mark image G2. Similarly, the position information of the projected marks M2 is, for example, coordinate values indicating the center of gravity positions of the projected mark M2 in the mark projected image PG2.

The relation data RD in the second form indicates identification information of the marks M1 and identification information of the projected marks M2 associate with each other. Even if the relation data RD does not include the position information of the marks M1, the position information of the marks M1 can be specified by referring to the first mark data MD1. The same applies to the position information of the projected marks M2.

In the following explanation, it is assumed that the relation data RD takes the second form.

The second generating section 886 generates correction data CD based on the relation data RD. In order to generate the correction data CD, it is necessary to calculate vectors V from the positions of the marks M1 to the positions of the projected marks M2. The vectors V are explained with reference to FIG. 12.

Figure 12:
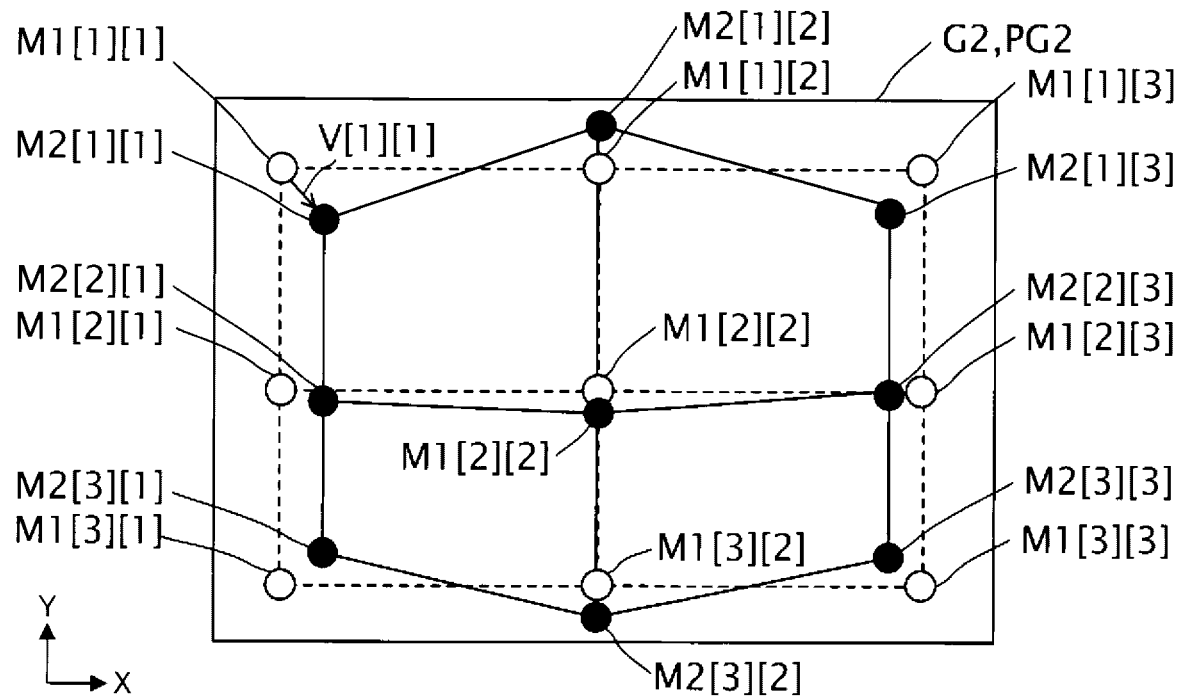
FIG. 12 is a diagram showing an example of a vector.

An example of the vectors V is shown in FIG. 12. In FIG. 12, to suppress complication of the drawing, a black background is replaced with white and displayed, the marks M1 are displayed as white circles, and the projected marks M2 are displayed as black circles. In FIG. 12, the maximum value YMAX is set to 3 and the maximum value XMAX is set to 3. Further, in FIG. 12, the marks M1 are connected by broken lines and the projected marks M2 are connected by solid lines.

The second generating section 886 calculates, with respect to a respective plurality of combinations that a variable i and a variable j can take, as a vector V[i][j], a value obtained by subtracting a coordinate value indicating the center of gravity position of the mark M1[i][j] corresponding to the projected mark M2[i][j] specified referring to the relation data RD from a coordinate value indicating the center of gravity position of the projected mark M2[i][j]. In the example shown in FIG. 12, i and j are integers from 1 to 3. In FIG. 12, to suppress complication of the drawing, among a vector V[1][1] to a vector V[3][3], only the vector V[1][1] is representatively displayed.

Figure 13:
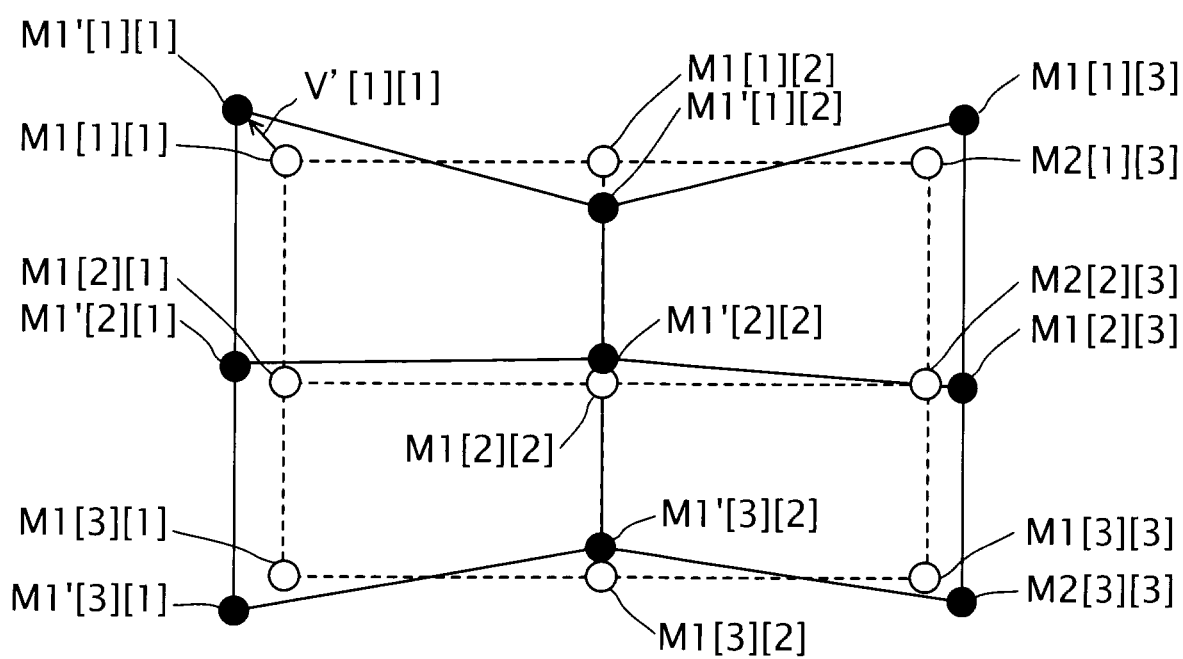
FIG. 13 is a diagram showing a generation example of correction data based on the vector.

A generation example of the correction data CD based on the vectors V is shown in FIG. 13. To offset distortion of an image projected onto the projection surface SC, the image data GD only has to be corrected to move, by inverse vectors V' of the vectors V, the positions of the marks M1 in an image indicated by the input image data GD. Content of the correction data CD is coordinate values indicating the positions of marks M1' after the movement. In FIG. 13, the mark M1[i][j] is displayed as a white circle and a mark M1'[i][j] after movement obtained by moving the mark M1[i][j] by an inverse vector V'[i][j] is displayed as a black circle. Further, in FIG. 13, the marks M1 are connected by broken lines and the marks M1' after the movement are connected by solid lines. In FIG. 13, in order to suppress complication of the drawing, among an inverse vector V'[1][1] to an inverse vector V'[3][3], only the inverse vector V'[1][1] is representatively displayed.

Referring back to FIG. 2, the correcting section 888 corrects the image data GD based on the correction data CD. Specifically, the correcting section 888 divides, with rectangular regions having the marks M1 as vertexes, the image indicated by the image data GD and corrects divided images obtained by the division to be fit in regions having, as vertexes, the marks M1 after the movement indicated by the correction data CD.

The projecting section 84 projects, onto the projection surface SC, the corrected image CG based on the corrected image data CGD obtained by correcting the image data GD.

A. 3. Operation in the First Embodiment

The operation of the projector 8 is explained with reference to FIGS. 14, 15, and 16. The projector 8 executes correction data generation processing for generating the correction data CD and image data projection processing for correcting the image data GD based on the correction data CD and projecting the corrected image CG based on the corrected image data CGD.

Figure 14:
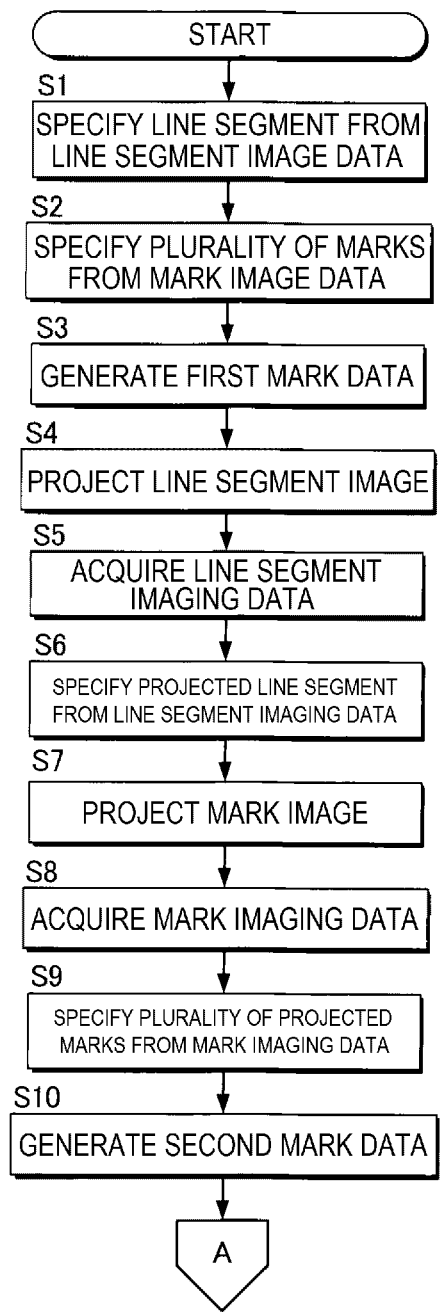
FIG. 14 is a flowchart showing correction data generation processing.
Figure 15:
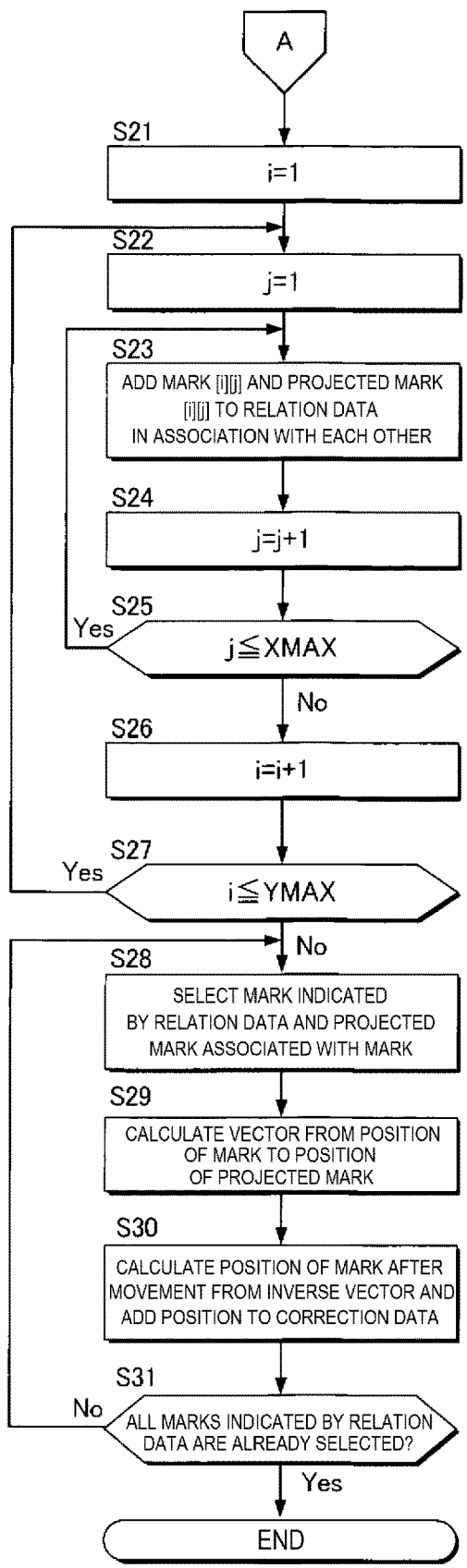
FIG. 15 is a flowchart showing the correction data generation processing.

FIGS. 14 and 15 are flowcharts showing the correction data generation processing. In step S1, the first generating section 884 specifies the line segment L1[1] to the line segment L1[YMAX] as the line segments L1 from the line segment image data GH1. Subsequently, in step S2, the first generating section 884 specifies a plurality of marks M1 from the mark image data GH2. In step S3, the first generating section 884 generates the first mark data MD1 based on position information of the line segment L1[1] to the line segment L1[YMAX] and position information of the respective plurality of marks M1.

Subsequently, in step S4, the projecting section 84 projects the line segment image G1 to thereby display the line segment projected image PG1 on the projection surface SC. In step S5, the acquiring section 881 acquires the line segment imaging data GI1 obtained by the imaging section 86 capturing the line segment projected image PG1. In step S6, the first generating section 884 specifies the projected line segment L2[1] to the projected line segment L2[YMAX] from the line segment imaging data GI1 as the projected line segments L2. In step S7, the projecting section 84 projects the mark image G2 to thereby display the mark projected image PG2 on the projection surface SC. In step S8, the acquiring section 881 acquires the mark imaging data GI2 obtained by the imaging section 86 capturing the mark projected image PG2. In step S9, the first generating section 884 specifies a plurality of projected marks M2 from the mark imaging data GI2. In step S10, the first generating section 884 generates the second mark data MD2 based on position information of the projected line segment L2[1] to the projected line segment L2[YMAX] and position information of the respective plurality of projected marks M2.

In step S21 shown in FIG. 15, the first generating section 884 substitutes 1 in the variable i. Further, in step S22, the first generating section 884 substitutes 1 in the variable j. Subsequently, the first generating section 884 adds, referring to the first mark data MD1 and the second mark data MD2, identification information of the mark M1[i][j] and identification information of the projected mark M2[i][j] to the relation data RD in association with each other.

The identification information of the mark M1[i][j] is identification information of the mark M1, which is indicated by the first mark data MD1, located on the line segment L1[i] and located in a j-th position counted from the −X direction. Similarly, the identification information of the projected mark M2[i][j] is identification information of the projected mark M2, which is indicated by the second mark data MD2, located on the projected line segment L2[i] and located in a j-th position counted from the −X direction.

After the processing in step S23 ends, in step S24, the first generating section 884 increases a value of the variable j by 1 and, in step S25, determines whether the value of the variable j is equal to or smaller than the maximum value XMAX. When a determination result in step S25 is affirmative, the first generating section 884 executes the processing in step S23. On the other hand, when the determination result in step S25 is negative, in step S26, the first generating section 884 increases a value of the variable i by 1 and, in step S27, determines whether the value of the variable i is equal to or smaller than the maximum value YMAX. When a determination result in step S27 is affirmative, the first generating section 884 executes the processing in step S22.

On the other hand, when the determination result in step S27 is negative, in step S28, the second generating section 886 selects the mark M1 indicated by the relation data RD and the projected mark M2 associated with the mark M1. In step S29, the second generating section 886 calculates the vector V from the position of the selected mark M1 to the position of the selected projected mark M2. In step S30, the second generating section 886 calculates, from the inverse vector V' of the vector V, a position of the mark M1' after the movement and adds the position of the mark M1' after the movement to the correction data CD.

After the processing in step S30 ends, in step S31, the second generating section 886 determines whether all the marks M1 indicated by the relation data RD are already selected. When a determination result in step S31 is negative, that is, when the mark M1 not selected yet is present among the marks M1 indicated by the relation data RD, the second generating section 886 executes the processing in step S28. In step S28, the second generating section 886 selects the mark M1 not selected yet among the marks M1 indicated by the relation data RD and the projected mark M2 associated with the mark M1.

On the other hand, when the determination result in step S31 is affirmative, the projector 8 ends a series of processing shown in FIGS. 14 and 15.

Figure 16:
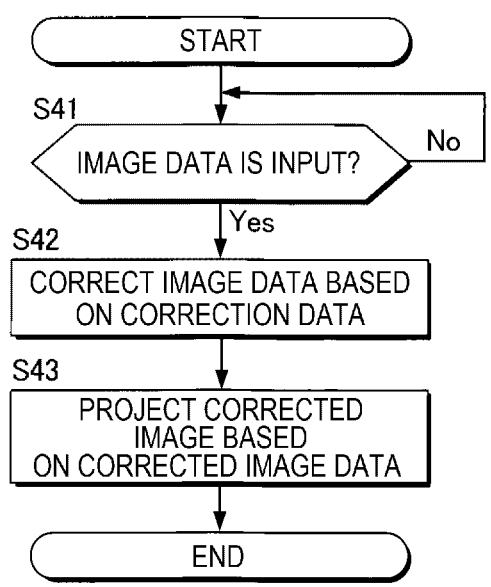
FIG. 16 is a flowchart showing image data projection processing.

A flowchart of the image data projection processing is shown in FIG. 16. In step S41, the processing section 88 determines whether the image data GD is input from the image providing device 4. When a determination result in step S41 is negative, that is, when the image data GD is not input, the processing section 88 executes the processing in step S41 again after a fixed period elapses.

On the other hand, when the determination result in step S41 is affirmative, in step S42, the correcting section 888 corrects the image data GD based on the correction data CD. In step S43, the projecting section 84 projects the corrected image CG based on the corrected image data CGD onto the projection surface SC. After the processing in step S43 ends, the projector 8 ends a series of processing shown in FIG. 16.

A. 4. Effects of the First Embodiment

As explained above, according to the first embodiment, in the projector 8, the projecting section 84 projects the line segment image G1 including the line segments L1 onto the projection surface SC to thereby display the line segment projected image PG1 on the projection surface SC, acquires the line segment imaging data GI1 obtained by capturing the line segment projected image PG1, when the maximum value XMAX is 2, projects the mark image G2 including the mark M1[i][1] and the mark M1[i][2] overlapping the line segment L1 onto the projection surface SC to thereby display the mark projected image PG2 on the projection surface SC, acquires the mark imaging data GI2 obtained by capturing the mark projected image PG2 displayed on the projection surface SC, generates, based on a positional relation between two projected marks M2 located on the projected line segment L2 corresponding to the line segment L1 in the mark imaging data GI2 and a positional relation between two marks M1 located on the line segment L1, the relation data RD that associates one mark M1 of the two marks M1 and one projected mark M2 of the two projected marks M2 using the line segment imaging data GI1 and associates the other mark M1 different from the one mark M1 and the other projected mark M2 of the two projected marks M2, generates, based on the relation data RD, the correction data CD for correcting distortion of an image projected onto the projection surface SC, corrects, based on the correction data CD, the image data GD input to the projector 8, and projects, onto the projection surface SC, the corrected image CG based on the corrected image data CGD obtained by correcting the image data GD.

Even when the projection surface SC is not a plane, a positional relation among the marks M1 on the line segments L1 is maintained in the projected marks M2 on the projected line segments L2. For example, on the line segment L1[i], a mark M1[i][j+1] is located in a +X direction when viewed from the mark M1[i][j]. Therefore, on the projected line segment L2[i] as well, a projected mark M2[i][j+1] is located in the +X direction when viewed from the projected mark M2[i][j]. By specifying the positional relation among the marks M1 on the line segments L1 and the positional relation among the projected marks M2 on the projected line segments L2 in this way, even when the projection surface SC is not a plane and the positions of the projected marks M2 are not aligned, the mark M1 corresponding to a certain projected mark M2 among the plurality of projected marks M2 can be easily specified. Since the mark M1 corresponding to the certain projected mark M2 can be easily specified, compared with when the mark M1 corresponding to the certain projected mark M2 is erred, distortion of the corrected image CG projected onto the projection surface SC can be suppressed.

The line segment image G1 is a stripe pattern including the line segments L1. Consequently, since the marks M1 are also arranged along the stripe pattern, when position coordinates of the marks M1 are specified from the mark image data GH2, the first generating section 884 only has to analyze the mark image G2 along the stripe pattern. Therefore, when the first mark data MD1 is generated by the second generation method, compared with when the line segment image G1 is not the stripe pattern, the first generating section 884 can easily generate the first mark data MD1.

The mark image G2 includes the plurality of marks M1 including the mark M1 located on the line segment L1[i]. The plurality of marks M1 are located at lattice points.

If the plurality of marks M1 are not located at the lattice points, since the correcting section 888 divides, with non-rectangular regions, the image indicated by the image data GD, the processing by the correcting section 888 is complicated. Therefore, when the plurality of marks M1 are located at the lattice points, compared with when the plurality of marks M1 are not located at the lattice points, the processing by the correcting section 888 can be facilitated.

When the position coordinates of the marks M1 are specified from the mark image data GH2, the first generating section 884 only has to analyze only the vicinities of the lattice points in the mark image G2. Therefore, when the first mark data MD1 is generated by the second generation method, compared with when the plurality of marks M1 are not located at the lattice points, the first generating section 884 can easily generate the first mark data MD1.

The plurality of marks M1 include the line segment L1[i+1] adjacent to the line segment L1[i]. The plurality of marks M1 include the mark M1 located on the line segment L1[i+1]. The distance between the marks M1 adjacent to each other among the plurality of marks M1 and the distance between the line segment L1[i] and the line segment L1[i+1] are the same distance d1. In other words, the distance among the lattice points in the mark image G2 and the thickness of stripes in the line segment image G1 are the same. The line segment L1[i+1] is an example of a "third line segment".

Since the distance among the lattice points in the mark image G2 and the thickness of the stripes in the line segment image G1 are the same, each of the plurality of marks M1 is located on anyone line segment L1 among the line segment L1[1] to the line segment L1[YMAX] of the line segment image G1. Therefore, the mark M1 corresponding to a certain projected mark M2 among the plurality of projected marks M2 can be easily specified.

B. Modifications

The aspects explained above can be variously modified. Specific aspects of modifications are illustrated below. Two or more aspects optionally selected out of the following illustrations can be combined as appropriate in a range in which the aspects do not contradict one another. In the modifications illustrated below, elements having action and functions equivalent to those in the embodiment are denoted by the reference numerals and signs used in the above explanation. Detailed explanation of the elements is omitted as appropriate.

In the aspects explained above, the line segments of the projection surface SC in a cut section parallel to the XZ plane have the same shape irrespective of a Y coordinate value of the cut section. In other words, the shape of the projection surface SC does not change in the Y-axis direction. If the shape of the projection surface SC does not change in the X-axis direction, the projecting section 84 only has to rotate the line segment image G1 90 degrees and project the line segment image G1 onto the projection surface SC.

The projector 8 explained above includes the imaging section 86. However, the projector 8 may not include the imaging section 86. For example, the projection system 1 may include a camera on the outside of the projector 8. The projector 8 may acquire the line segment imaging data GI1 and the mark imaging data GI2 from the camera.

In the aspects explained above, the marks M1 included in the mark image G2 are arranged in the positions of the lattice points. However, the marks M1 only have to overlap the line segments L1. The distances among the marks M1 adjacent to one another may not be the same. Similarly, the line segment L1[1] to the line segment L1[YMAX] included in the line segment image G1 may not be parallel to the lateral direction.

In the aspects explained above, the line segments L1 are the straight lines. However, not only this, but the line segments L1 may be, for example, curved lines or polygonal lines. The line segment L1[1] to the line segment L1[YMAX] only have to not cross one another and may not be parallel to one another.

In the aspects explained above, the positional relation among the mark M1[i][1] to the mark M1[i][XMAX] is indicated by in which positions counted from the −X direction the marks M1 are located. However, not only this, but the positional relation among the mark M1[i][1] to the mark M1[i][XMAX] may be indicated by in which positions counted from the +X direction the marks M1 are located. Similarly, the positional relation among the projected mark M2[i][1] to the projected mark M2[i][XMAX] may be indicated by in which positions counted from the +X direction the projected marks M2 are located.

In the projecting section 84 in the aspects explained above, the liquid crystal light valve is used as the light modulating device. However, the light modulating device is not limited to the liquid crystal light valve and can be changed as appropriate. For example, the light modulating device may be a component including three reflective liquid crystal panels. The light modulating device may be a component of a type including one liquid crystal panel, a type including three DMDs, a type including one digital mirror device, or the like. DMD is an abbreviation of Digital Micromirror Device. When only one liquid crystal panel or DMD is used as the light modulating device, members equivalent to a color separation optical system and a color combination optical system are unnecessary. Besides the liquid crystal panel and the DMD, a component capable of modulating light emitted by the light source can be adopted as the light modulating device.

In the aspects explained above, all or a part of the elements realized by the processing section 88 executing programs may be realized as hardware by an electronic circuit such as an FPGA or an ASIC or may be realized by cooperation of the software and the hardware. FPGA is an abbreviation of Field Programmable Gate Array. ASIC is an abbreviation of Application Specific IC. The present disclosure is also specified as a control method for the projector 8 according to the aspects explained above.

What is claimed is:

1. A control method for a projector comprising:
   projecting a first image including a first line segment onto a projection surface to thereby display a first projected image on the projection surface;
   acquiring first imaging data obtained by capturing the first projected image;
   projecting a second image including a first mark and a second mark overlapping the first line segment onto the projection surface to thereby display a second projected image on the projection surface;
   acquiring second imaging data obtained by capturing the second projected image;
   generating, based on a positional relation between a third mark and a fourth mark located on a second line segment corresponding to the first line segment in the second imaging data, the third mark and the fourth mark corresponding to the first mark and the second mark respectively, and a positional relation between the first mark and the second mark located on the first line segment, using the first imaging data, relation data that associates the first mark and the third mark and associates the second mark and the fourth mark;
   generating, based on the relation data, correction data for correcting distortion of an image projected onto the projection surface;
   correcting, based on the correction data, image data input to the projector; and
   projecting, onto the projection surface, a corrected image based on corrected image data obtained by correcting the image data.

2. The control method for the projector according to claim 1, wherein the first image is a stripe pattern including the first line segment.

3. The control method for the projector according to claim 1, wherein the second image includes a plurality of marks including the first mark and the second mark, and the plurality of marks are located at lattice points.

4. The control method for the projector according to claim 3, wherein the first image includes a third line segment adjacent to the first line segment, the plurality of marks include a mark located on the third line segment, and a distance between marks adjacent to each other among the plurality of marks and a distance between the first line segment and the third line segment are same.

5. A projector comprising:
   a projection lens configured to project an image onto a projection surface; and
   one or more processors storing one or more programs that when executed by the one or more processors cause the one or more processors to:
   acquire imaging data obtained by capturing the image projected onto the projection surface;
   generate relation data that associates marks included in two images;
   generate, based on the relation data, correction data for correcting distortion of the image projected onto the projection surface; and
   correct image data input to the projector,
   wherein the projection lens projects a first image including a first line segment onto the projection surface to thereby display a first projected image on the projection surface,
   wherein the one or more processors acquire first imaging data obtained by capturing the first projected image, the projection lens projects a second image including a first mark and a second mark overlapping the first line segment onto the projection surface to thereby display a second projected image on the projection surface, the one or more processors acquire second imaging data obtained by capturing the second projected image,
   wherein the one or more processors generate, based on a positional relation between a third mark and a fourth mark located on a second line segment corresponding to the first line segment in the second imaging data, the third mark and the fourth mark corresponding to the first mark and the second mark respectively, and a positional relation between the first mark and the second mark located on the first line segment, using the first imaging data, the relation data that associates the first mark and the third mark and associates the second mark and the fourth mark,
   wherein the one or more processors generate the correction data based on the relation data,
   wherein the one or more processors correct, based on the correction data, the image data input to the projector, and
   wherein the projection lens projects, onto the projection surface, a corrected image based on corrected image data obtained by correcting the image data.

* * * * *